(12) United States Patent
Caponetti et al.

(10) Patent No.: US 11,286,911 B2
(45) Date of Patent: Mar. 29, 2022

(54) RELATING TO WIND TURBINE ROTOR ANGLE SENSING SYSTEMS

(71) Applicant: VESTAS WIND SYSTEMS A/S, Aarhus (DK)

(72) Inventors: Fabio Caponetti, Åbyhøj (DK); Kristian Kiib, Skødstrup (DK); Dan Hilton, Gjern (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 155 days.

(21) Appl. No.: 16/617,206

(22) PCT Filed: May 25, 2018

(86) PCT No.: PCT/DK2018/050118
§ 371 (c)(1),
(2) Date: Nov. 26, 2019

(87) PCT Pub. No.: WO2018/215042
PCT Pub. Date: Nov. 29, 2018

(65) Prior Publication Data
US 2020/0284242 A1 Sep. 10, 2020

(30) Foreign Application Priority Data

May 26, 2017 (DK) .............................. PA201770385

(51) Int. Cl.
*F03D 17/00* (2016.01)
*F03D 7/02* (2006.01)
*F03D 7/04* (2006.01)

(52) U.S. Cl.
CPC ........... *F03D 17/00* (2016.05); *F03D 7/0224* (2013.01); *F03D 7/042* (2013.01); *F05B 2270/32* (2013.01);

(Continued)

(58) Field of Classification Search
None
See application file for complete search history.

(56) References Cited

U.S. PATENT DOCUMENTS 7,945,351 B2 * 5/2011 Lim ...................... F03D 7/0296
700/287
9,353,727 B2 * 5/2016 Slot ......................... F03D 1/065
(Continued)

FOREIGN PATENT DOCUMENTS

CN 102338034 A 2/2012
CN 104074687 A 10/2014
(Continued)

OTHER PUBLICATIONS

Chinese Office Action for Application No. 201880034691.3 dated Apr. 7, 2020.
(Continued)

*Primary Examiner* — Juan G Flores
(74) *Attorney, Agent, or Firm* — Patterson + Sheridan, LLP (57) ABSTRACT

This application describes a method of detecting an error in a rotor angle sensing system of a wind turbine, where the wind turbine comprises a rotor including a plurality of wind turbine blades, a blade load sensor associated with a respective one of the wind turbine blades, and a rotor angle sensing system configured to output a rotor angle signal. The blade load sensor is configured to output a measured blade load signal. The method comprises generating an estimated blade load signal based on at least the rotor angle signal; comparing the estimated blade load signal with the measured blade load signal to determine a phase difference between them; and identifying an error if the phase difference between the estimated blade load signal and the measured blade load signal exceeds a predetermined threshold.

18 Claims, 6 Drawing Sheets

(52) U.S. Cl.
CPC ... *F05B 2270/326* (2013.01); *F05B 2270/327* (2013.01); *F05B 2270/328* (2013.01); *F05B 2270/331* (2013.01); *F05B 2270/802* (2013.01)

(56) References Cited

U.S. PATENT DOCUMENTS

| | | | |
|---|---|---|---|
| 2010/0148507 A1* | 6/2010 | Lim | F03D 7/0292 290/44 |
| 2011/0135469 A1 | 6/2011 | Scholte-Wassink | |
| 2011/0135474 A1 | 6/2011 | Thulke et al. | |
| 2011/0142593 A1 | 6/2011 | Hoffmann et al. | |
| 2012/0292905 A1* | 11/2012 | Slot | F03D 17/00 290/44 |

FOREIGN PATENT DOCUMENTS

| | | |
|---|---|---|
| CN | 105913005 A | 8/2016 |
| CN | 105980703 A | 9/2016 |
| CN | 106014857 A | 10/2016 |
| CN | 106460793 A | 2/2017 |
| CN | 106528908 A | 3/2017 |
| DE | 102015119986 A1 | 5/2017 |
| EP | 1666723 A1 | 6/2006 |
| EP | 2354538 A1 | 8/2011 |
| EP | 2615303 A1 | 7/2013 |
| EP | 2749766 A1 | 7/2014 |
| EP | 3141746 A1 | 3/2017 |
| ES | 2408246 A2 | 6/2013 |
| JP | 2017053274 A | 3/2017 |
| WO | 2016206692 A1 | 12/2016 |
| WO | 2018215042 A1 | 11/2018 |

OTHER PUBLICATIONS

Danish Patent and Trademark Office 1st Technical Examiation for Patent Application No. PA 2017 70385 dated Nov. 20, 2017.
PCT Written Opinion of the International Searching Authority for Application No. PCT/DK2018/050118.
PCT Internationa Search Report for Application No. PCT/DK2018/050118 dated Jul. 19, 2018.

* cited by examiner

RELATING TO WIND TURBINE ROTOR ANGLE SENSING SYSTEMS

TECHNICAL FIELD

The invention relates to a rotor angle sensing system in a wind turbine and, more specifically, to an approach for verifying the accuracy of a rotor angle sensing system in order to ensure reliable operation of wind turbine sub-systems that depend on the accuracy of such sensing systems.

BACKGROUND

Wind turbines are designed to operate reliably and safely under a wide range of wind conditions. To do so, the sensing systems and control systems must function in the correct way and be accurately installed and set up. An error in the installation or set-up of one system may cause an effect in subsequent, dependent systems within the wind turbine.

For example, rotor angle sensing systems generate a measurement signal that indicates the angular position of the rotor. Typically, one of the wind turbine blades is identified as a reference blade, and the rotor angle will be considered to be at a zero angle when that reference blade is at a predetermined reference position, for example when pointing vertically downwards. Note that rotor angle sensing systems are sometimes also referred to as azimuth position sensing systems.

In modern wind turbines, there are several operational sub-systems that rely on an accurate measurement of the rotor angle position. For example, active tower damping systems are responsible for reducing swaying movements of the nacelle by generating counter-thrust and side-to-side forces by controlling the cyclical pitch positions of the blades. The effectiveness of such a control function will be reduced if the rotor position signal is inaccurate.

Other control functions that rely on accurate rotor angle position measurement are tilt-yaw control systems, rotor lift control, blade load calibration etc.

The present invention has been devised to mitigate or overcome at least some of the above-mentioned problems.

SUMMARY OF THE INVENTION

According to an aspect of the present invention there is provided a method of detecting an error in a rotor angle sensing system of a wind turbine. The wind turbine comprises a rotor including a plurality of wind turbine blades, a blade load sensor associated with a respective one of the wind turbine blades, and a rotor angle sensing system. The blade load sensor is configured to output a measured blade load signal, and the rotor angle sensing system is configured to output a rotor angle signal. The method comprises generating an estimated blade load signal based on the rotor angle signal, comparing the estimated blade load signal with the measured blade load signal to determine a phase difference between them, and identifying an error if the phase difference between the estimated blade load signal and the measured blade load signal exceeds a predetermined threshold.

The method provides a quick and convenient test to ensure correct installation and operation of the wind turbine's rotor angle sensing system, where previously no such test existed beyond monitoring the day-to-day operation of the wind turbine, identifying anomalous behaviour and manually inspecting every system in each individual wind turbine.

The method is also particularly useful in that it can be performed during commissioning of the wind turbine, before the wind turbine is deemed fully operational. This reduces the likelihood of damage being caused to the wind turbine when it is subjected to the stresses of full operation.

Furthermore, because only the phases of the two signals are compared, the method only requires that the blade load sensors be set-up and operational. In other words, the calibration of the blade load sensors isn't necessary for the test method to be carried out as only the phase is required to perform the comparison. This is particularly beneficial if the blade load sensor calibration is dependent upon sensing the rotor angle of the respective blade as the test method removes one potential source of error in the calibration of the blade load sensors.

Another benefit of the method is its potential for remote activation. In other words, the method allows an engineer or other trained user to perform the method off site and to implement any changes required without the need for inspection of each individual turbine. This, in turn, significantly reduces the time and cost required to verify correct installation and to troubleshoot suspected errors on existing turbines.

The method may comprise operating the wind turbine in an idling mode. An idling mode may comprise altering the pitch of one or more of the wind turbine blades to adopt a feathered position. For example, the idling mode may comprise altering the pitch of all the wind turbine blades of the wind turbine to adopt the feathered position, or may comprise only one of the blades being adjusted to adopt the feathered position while the pitch of the remaining blades is adjusted to maintain rotation of the rotor.

Feathering at least one blade is particularly useful in reducing loads exerted on the rotor, thereby allowing for an improved comparison between estimated and measured blade loads.

The step of operating the wind turbine in an idling mode may be performed prior to the estimation of the output of the at least one blade load sensor.

The estimated blade load signal may be indicative of the blade self-weight moment at an associated rotor angle. The estimated blade load signal may be based on at least one of blade pitch angle, rotor speed and wind speed. The estimations can be made more precise by basing them on at least one of these parameters, The method may comprise adjusting the operation of the wind turbine if an error is identified.

Adjusting the operation of the wind turbine may comprise generating a control signal based on a modified rotor angle signal. The modified rotor angle signal may be determined by applying a phase shift to the rotor angle signal, and this phase shift may be equal to the determined phase difference.

The rotor angle signal may be measured relative to a designated reference blade. The step of adjusting the operation of the wind turbine may comprise re-designating the reference blade.

The comparison may be performed for at least one revolution of the rotor.

The method may comprise identifying the type of error if the phase difference between the estimated blade load signal and the measured blade load signal is in a predetermined range of values. The method may comprise adjusting the operation of the wind turbine based on the type of error identified.

The wind turbine may comprise a plurality of blade load sensors. Each blade load sensor may correspond to a respective wind turbine blade and may be configured to output a measured blade load signal for its respective wind turbine blade.

According to another aspect of the invention, there is provided a wind turbine comprising: a rotor including a plurality of wind turbine blades mounted to a hub, the rotor being rotatable about a central axis; at least one blade load sensor corresponding to one of the wind turbine blades; a rotor angle sensing system configured to output a rotor angle signal; and a processing unit configured to carry out a method as described above.

According to a further aspect of the invention, there is provided a power plant controller for a power plant having a plurality of wind turbines, the power plant controller comprising a processing unit configured to carry out a method as described above.

According to a further aspect of the invention, there is provided a computer program product downloadable from a communication network and/or stored on a machine readable medium, comprising program code instructions for implementing a method in accordance with a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described by way of example with reference to the accompanying drawings, in which.

DETAILED DESCRIPTION

Figure 1:
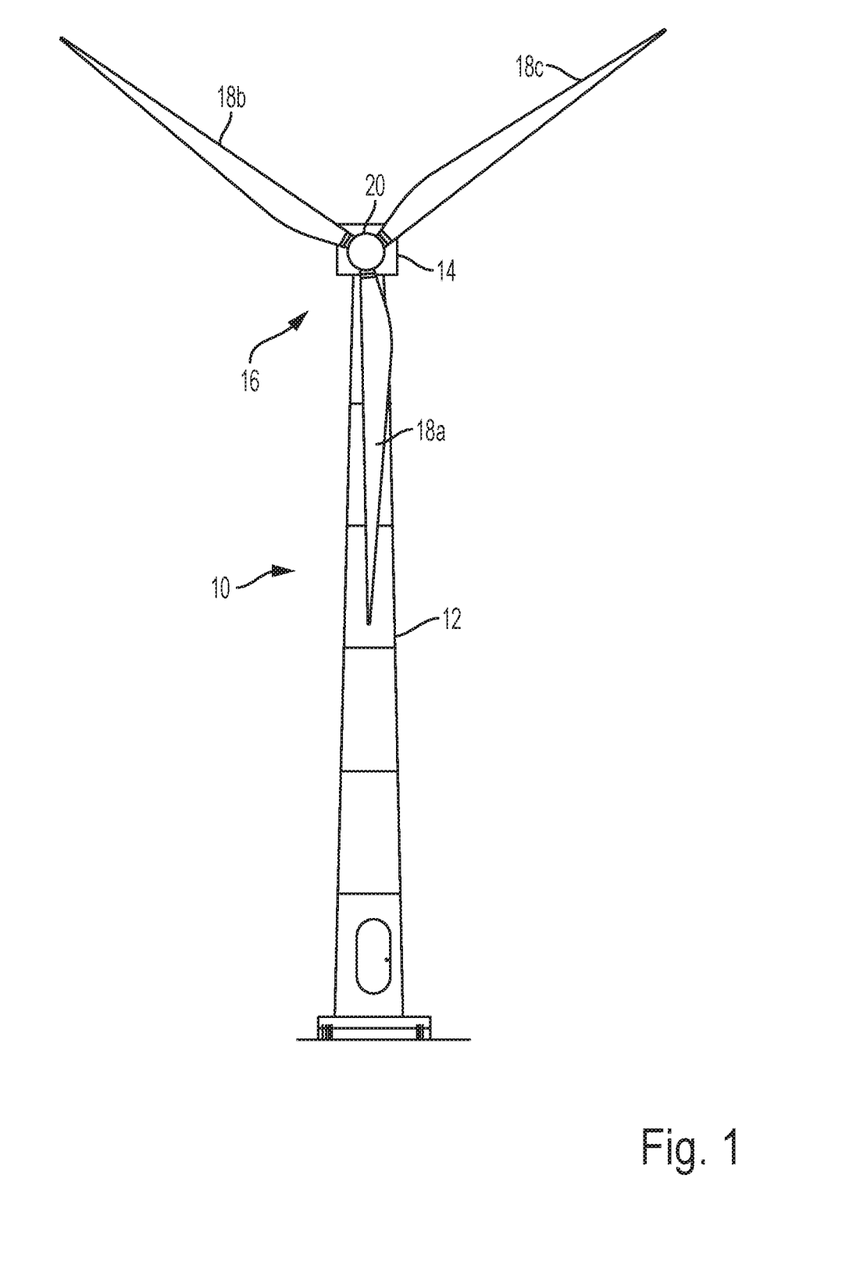
FIG. 1 is a schematic view of a wind turbine according to an embodiment of the present invention.

FIG. 1 shows a wind turbine 10 comprising a tower 12 supporting a nacelle 14 to which a rotor 16 is mounted. The rotor 16 comprises a plurality of wind turbine blades 18a, 18b, 18c, wherein each of the plurality of wind turbine blades 18a, 18b, 18c extends radially from a central hub 20. In this example, the rotor 16 comprises three blades 18a, 18b, 18c, although other configurations are possible. The rotor 16 is rotatably mounted to a main rotor shaft (not shown) by a mounting portion (not shown in FIG. 1), which, as is known in the art, is in the form of a circular flange.

Figure 2:
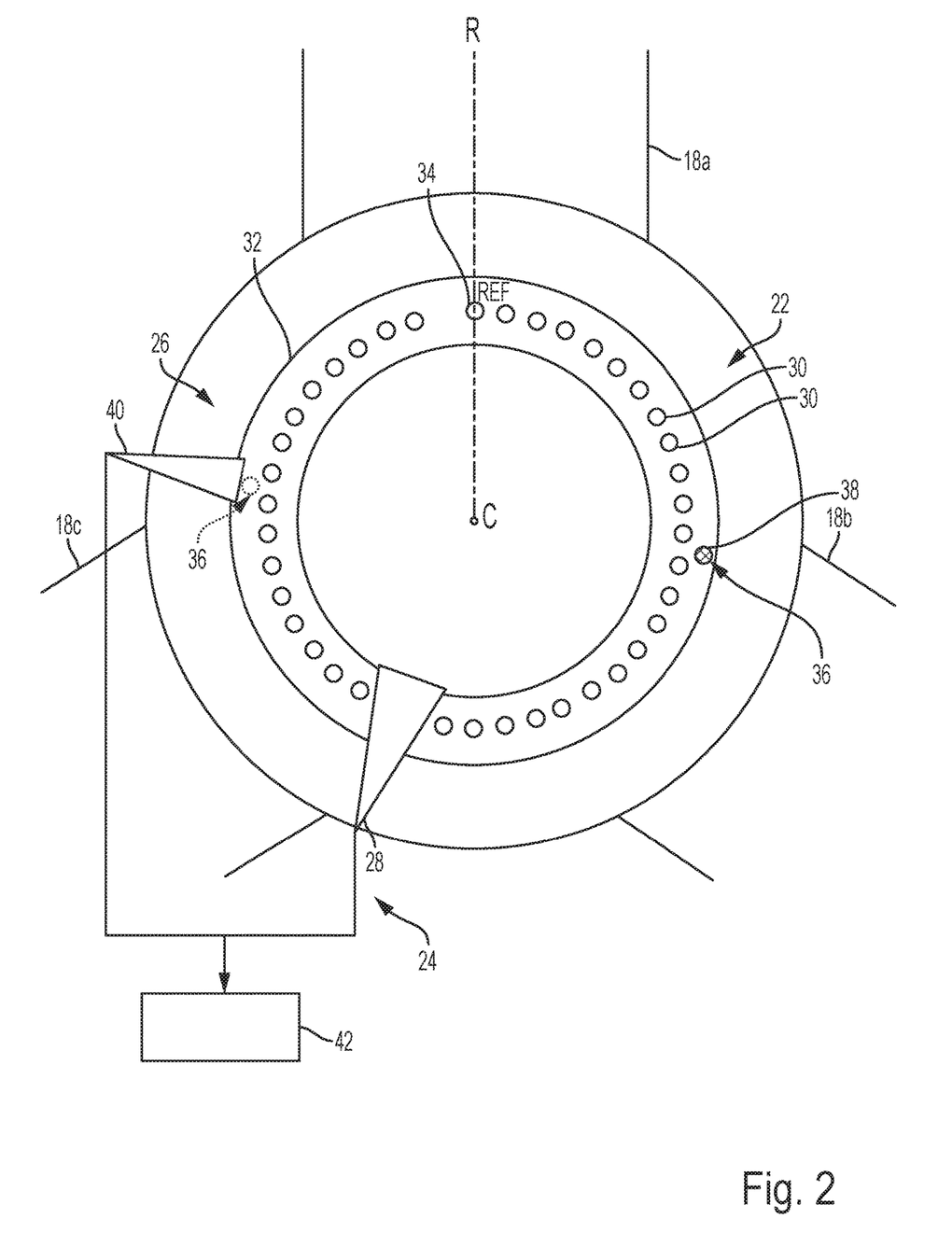
FIG. 2 is a simplified rear view of a wind turbine hub assembly and wind turbine blade including a rotor angle sensing system that forms part of the wind turbine of FIG. 1.

The mounting portion 22 of the hub 20 is shown in FIG. 2, with part of each blade 18a, 18b, 18c and a rotor angle (or azimuth position) sensing system 24. The rotor angle sensing system 24 is used to detect the angle of the rotor 16 during rotation of the rotor 16 and rotor shaft (not shown), and comprises a zero-angle sensor 26 and an angle measurement device 28. The zero-angle sensor 26 is configured to indicate when a blade that has been designated as the 'reference blade' is at its lowest point of rotation and is pointing directly downwards, while the angle measurement device 28 registers incremental changes in the angle of the rotor 16. It should be appreciated that this general configuration would be well understood by the skilled person.

In FIG. 1, the blade 18a designated the reference blade is at its lowest point of rotation, so is aligned with the tower 12 and extends vertically downwards. In this case, the true rotor angle is zero degrees. As used herein, the term 'true rotor angle' refers to the angle of the reference blade relative to the zero-angle position in which the blade extends vertically downward. This term is used to distinguish from measured rotor angles that may incorporate errors due to incorrect set-up or installation of the rotor angle sensing system 24 relative to the reference blade, or otherwise.

In FIG. 2, the reference blade is considered to be the blade 18a pointing vertically upwards, and so the true rotor angle here is considered to be 180 degrees. The rotor 16 has rotated by a half revolution or 180 degrees from the position shown in FIG. 1.

As discussed above, the hub 20 connects to the main rotor shaft (not shown) by way of the mounting portion 22. The mounting portion 22, shown in FIG. 2, comprises a plurality of bolts 30 arranged around the circular flange 32 whose centre C is aligned with a centre of rotation of the hub 20. A reference marking, here indicated by the mark 'REF', is present on the mounting portion 22, and this reference marking specifies a 'reference' bolt 34 of the set with which a central axis R of the reference blade 18a should be aligned. The reference blade 18a is aligned with this bolt 34 during installation of the turbine 10, although in some situations the blade 18a and bolt may be misaligned, leading to an error in the measurement of the rotor angle.

In addition to the plurality of bolts 30, the mounting portion 22 comprises two recesses 36 located on opposite sides of the mounting portion 22, and so are considered to be approximately 180 degrees apart when measuring rotor angle. The positioning of the recesses 36 relative to one another may be different from 180 degrees in some embodiments. For example, the angles may be different because more recesses are incorporated into the mounting portion 22, or because of general engineering tolerances and manufacturing differences.

A zero-angle indicator 38, which forms part of the zero-angle sensor 26, is placed within one of the recesses 36. The zero-angle sensor 26, which also comprises a sensing device 40, determines when the reference blade 18a is at the zero-angle position, and effectively acts as a 'reset' for the rotor angle sensing system 24 to mark when a revolution of the reference blade 18a, and hence the rotor 16, has been completed and that measurement from zero degrees should be begun again.

In the cases shown in FIG. 2, the sensing device 40 is a magnetic sensor, and the indicator 38 is a magnet, although it will be appreciated that a variety of different sensors may be used to perform this function. The device 40 and indicator 38 are respectively mounted to and positioned relative to the mounting portion 22 such that the indicator 38 passes the device 40 when the reference blade 18a is in the zero-angle position. At this point it should be noted that the configuration of rotor angle sensing systems would be well known to the skilled person and so only an overview is being provided here.

After the rotor angle of zero degrees has been established, the angle measurement device 28, which in this embodiment comprises a hall effect sensor, incrementally identifies a change in angle of the mounting portion 22 relative to the angle measurement device 28, and hence the change in angle of the reference blade 18a and rotor 16. While a hall effect sensor is envisaged here, other sensors or incremental encoders may be used, such as optical or ultrasonic sensors. The measured rotor angle is calculated by the rotor angle sensing system 24, before being communicated to a central processing module 42, which is configured to receive the output of a plurality of sensors and to distribute control commands to components within the wind turbine 10 accordingly.

Figure 3:
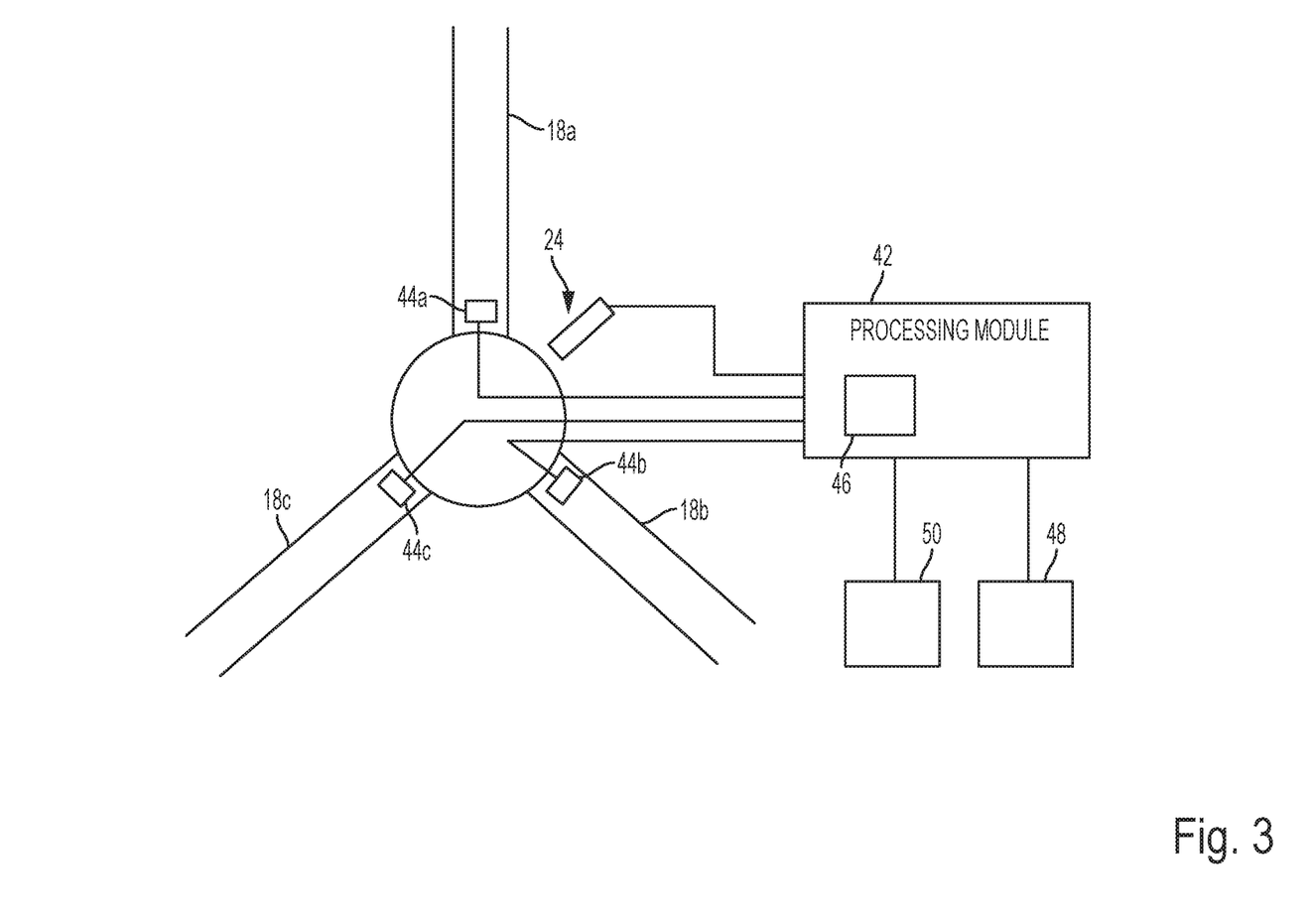
FIG. 3 is a schematic systems view of the wind turbine in FIG. 1.

Turning now to FIG. 3, which illustrates the wind turbine 10 at a systems level, the rotor angle sensing system 24 and central processing module 42 are shown in combination with a plurality of blade load sensors 44a, 44b, 44c, one per blade 18a, 18b, 18c. Each of the blade load sensors 44a, 44b, 44c is configured to measure lateral blade loads acting upon the respective blade 18a, 18b, 18c and in particular, blade root strains. It can also be seen in FIG. 3 that the central processing module 42 incorporates a blade load estimation module 46.

Furthermore, the processing module 42 connects to and receives outputs from a number of other sensors and/or other components within the wind turbine 10. Information is communicated by the processing module 42 to a user terminal 48 for a user to view the information or to an external processor 50 such as a power plant controller. These other sensors, components, systems and terminals have not been depicted in detail here and will not be discussed further as their operation would be known to the skilled person. Although the processing module 42 is shown as a dedicated processing environment for the system, it should be appreciated that the functionality ascribed to the processing module 42 may be incorporated within a generic wind turbine control system platform.

The processing module 42 is configured to perform a test method either when activated and controlled to perform the test method and/or during commissioning of the wind turbine 10 to establish that measurements of the rotor angle made by the rotor angle sensing system 24 are correct. In a general sense, this is achieved by comparison of instantaneous blade load measurements made by each blade load sensor 44a, 44b, 44c with an estimated blade load signal for a plurality of rotor angles measured by the rotor angle sensing system 24.

The test method makes use of the fact that the loads experienced by the blades 18a, 18b, 18c due to gravity can be indicative of the where that blade 18a, 18b, 18c is within a rotational cycle. For example, in a situation in which only the blade self-weight moment acts on the reference blade 18a, for example when the reference blade 18a is pointing vertically downwards, the output of the respective blade load sensor 44a will be substantially zero since the blade 18a is not subject to forces that would cause the blade 18a to bend. Conversely, if the reference blade 18a is in a position in which it extends horizontally from the hub 20, i.e. at a true rotor angle of 90 degrees or 270 degrees, then the strain on the blade 18a due purely to its own weight will be at a maximum value.

The blade loads experienced by each blade 18a, 18b, 18c and measured by the blade load sensors 44a, 44b, 44c are therefore predictable for the entire revolution of the rotor 16 provided no external loads act on the each blade 18a, 18b, 18c other than gravitational force. This invention exploits this phenomenon in order to determine whether the rotor angle sensing system 24 is providing accurate readings of the actual angular position of the rotor 16.

In the wind turbine 10, an estimation of the blade loads is performed by the blade load estimator 46. For each measured rotor angle measured by the rotor angle sensing system 24, the blade load estimator 46 estimates a blade load signal indicative of the gravitational blade loads and this estimated blade load signal is output by the blade load estimator 46 to the processing module 42.

The blade load estimator 46 is a conventional real-time estimator with which the skilled person would be familiar and would consider to be common general knowledge. Typical examples of blade load estimators and the relevant theory may be found in the patent applications having publication nos. WO 2017/000947 A1 and WO 2017/00948 A1, and in textbooks such as 'Aerodynamics of Wind Turbines' by Martin O. L. Hansen.

To allow comparison of the estimated blade load signals and the measured blade loads, the wind turbine 10 should be operated in a mode in which external forces are minimised. To achieve this, the wind turbine 10 is operated in an 'idling' mode, in which the pitch angle of each blade 18a, 18b, 18c is altered so that the blades 18a, 18b, 18c adopt a 'feathered' position.

In the feathered position, the blade loads are expected to be significantly reduced when compared to the loads experienced during normal operational modes. In the feathered position, the pitch angle of the blades 18a, 18b, 18c is substantially different to their pitch angle when the wind turbine 10 is operating in a normal mode.

The rotor 16 and blades 18a, 18b, 18c still rotate during the idling mode, but the blades 18a, 18b, 18c do not generate the lift that would present if the turbine 10 were operating in a normal operational mode. In ideal circumstances, the blade pitch angle would be set such that the blades 18a, 18b, 18c would not generate any lift, but since this is unlikely in practice due to variations in wind speed and direction, here an idling mode should be considered to be an operational mode in which the lift generated by the blades 18a, 18b, 18c, and, thus, the aerodynamic load experienced by the blades 18a, 18b, 18c, are close to zero.

By measuring the blade loads while the wind turbine 10 is in its idling mode, a comparison can be made between the estimated blade load signal received from the blade load estimator 46 and the measured blade load measured by one or more of the blade load sensors 44a, 44b, 44c. If the rotor angle sensing system 24 is correctly installed such that the rotor angle readings provided by it are accurate, then the curve that passes through the estimated blade load signals and the curve fitted to the measured blade loads should be substantially in phase. However, if there is an error present, a phase difference will be identified.

It should be understood that small phase differences between the measurements and the estimations are likely due to variation in wind turbine design or mounting of the equipment, and that certain tolerances would be able to be incorporated into the system to account for this. A predetermined minimum phase difference threshold may be incorporated which the system either accounts for automatically, or which the system does not react to.

Based on the above understanding, the processing module 42 is configured to implement a test process to identify whether the rotor angle sensing system 24 is generating accurate data about the rotational position of the rotor 16.

Figure 4:
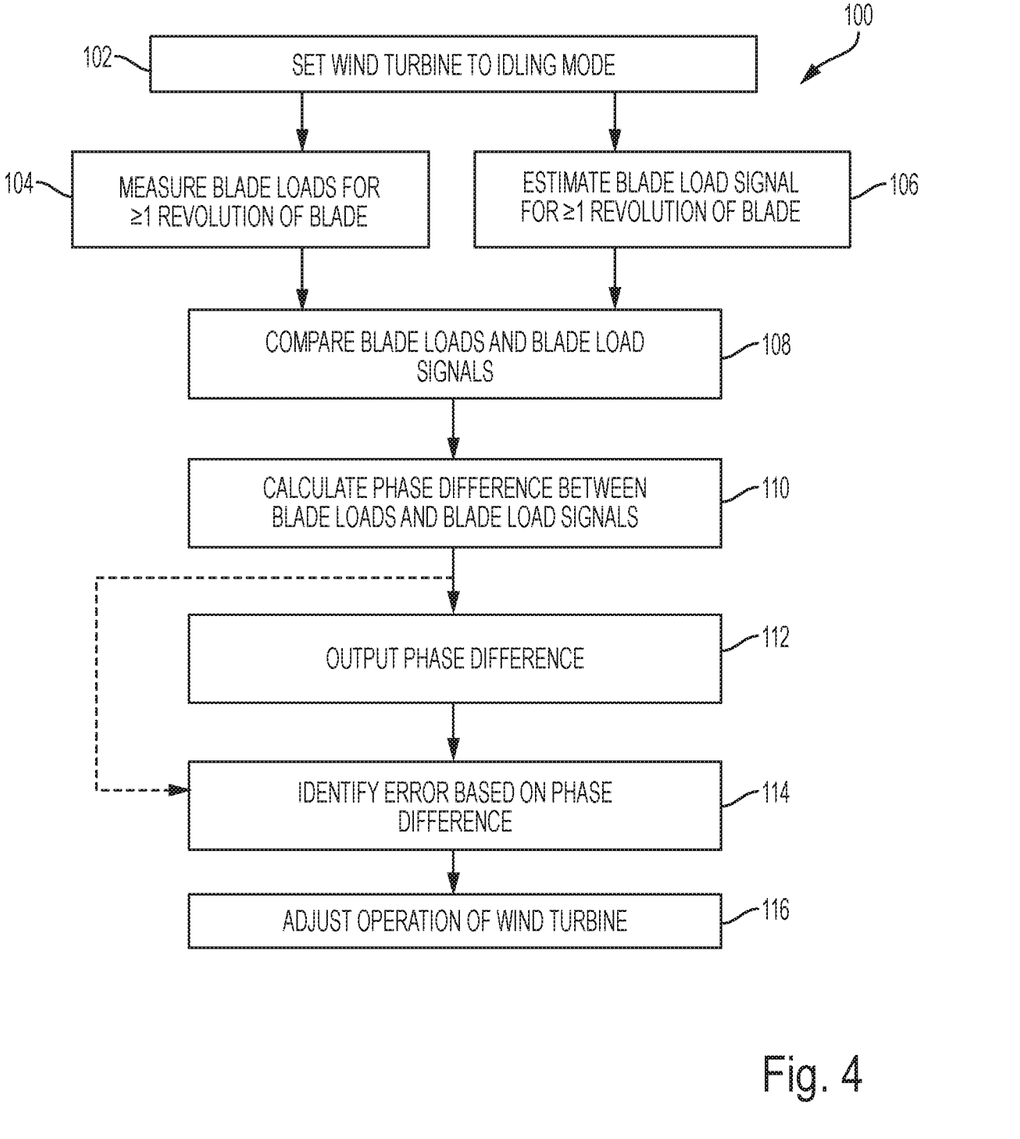
FIG. 4 is a flow chart that illustrates a turbine test function process, according to an embodiment of the present invention, to determine whether the rotor angle sensing system of the wind turbine of FIG. 1 is correctly installed.

FIG. 4 shows an example embodiment of the test method 100 that may be implemented on a wind turbine 10 such as that shown in FIG. 1. The method 100 shown is carried out following installation of the wind turbine 10 at its installation site. It is envisaged that the test method 100 may be started by a user using a user terminal 48 connected to the processing module 42, since once the test method 100 has been run to check that the rotor angle sensing system 24 is operating correctly, then there should not be a further need to run the test method 100 again. However, if necessary, the test method 100 may also be run periodically, either on user-demand or on an automatic basis.

At a first step 102 of the method 100 of FIG. 4, it is required that the turbine 10 is set into the idling mode so that the rotor 16 rotates but blade loads are minimised. Here, the test method 100 may communicate with a higher level control functionality of the control system responsible for determining the operational control mode settings of the wind turbine 10. If the operational circumstances of the wind turbine 10 are appropriate, then the higher level control function will command the wind turbine 10 into an idle condition and confirm to the test mode that this has been completed so that the test method 100 can progress.

Next, for at least one full revolution of the rotor 16, the test method 100 requires the measurement 104 of blade loads output from at least one blade load sensor 44a, 44b, 44c. In this embodiment, the blade load output of the blade load sensor 44a corresponding to the reference blade 18a will be measured as a minimum. In some embodiments, the output of the other blade load sensors 44b, 44c may be used.

Similarly, the blade load estimator 46 generates 106 a blade load signal that corresponds to the blade root strain of the reference blade 18a, estimated for at least one revolution of the rotor 16. As previously discussed, the blade load signals are estimated 106 based upon the rotor angle measured by the rotor angle sensing system 24 and other relevant signals. The data gathering of the measured blade load data and the estimated blade load signal data are carried out simultaneously.

It is possible that the measurement 104 and estimation 106 are performed over multiple revolutions of the rotor 16, or, alternatively, only over part of a revolution depending upon the require accuracy.

Once the data gathering has been completed, the measured blade loads and the estimated blade load signals are compared 108. Only the phases are compared 108, as the magnitude of the measured blade loads may differ from the corresponding estimated blade load signal, based on external conditions and due to differences in the set-up of each wind turbine 10.

A phase difference between the measured blade loads and the estimated blade load signals is then calculated or determined 110. The phase difference corresponds to an error in the rotor angle sensing system 24 set-up, and so appropriate correction is required either by physical repair or software correction. A phase difference may also be the result of an error in the positioning of the blade or blade load sensor.

Figure 5:
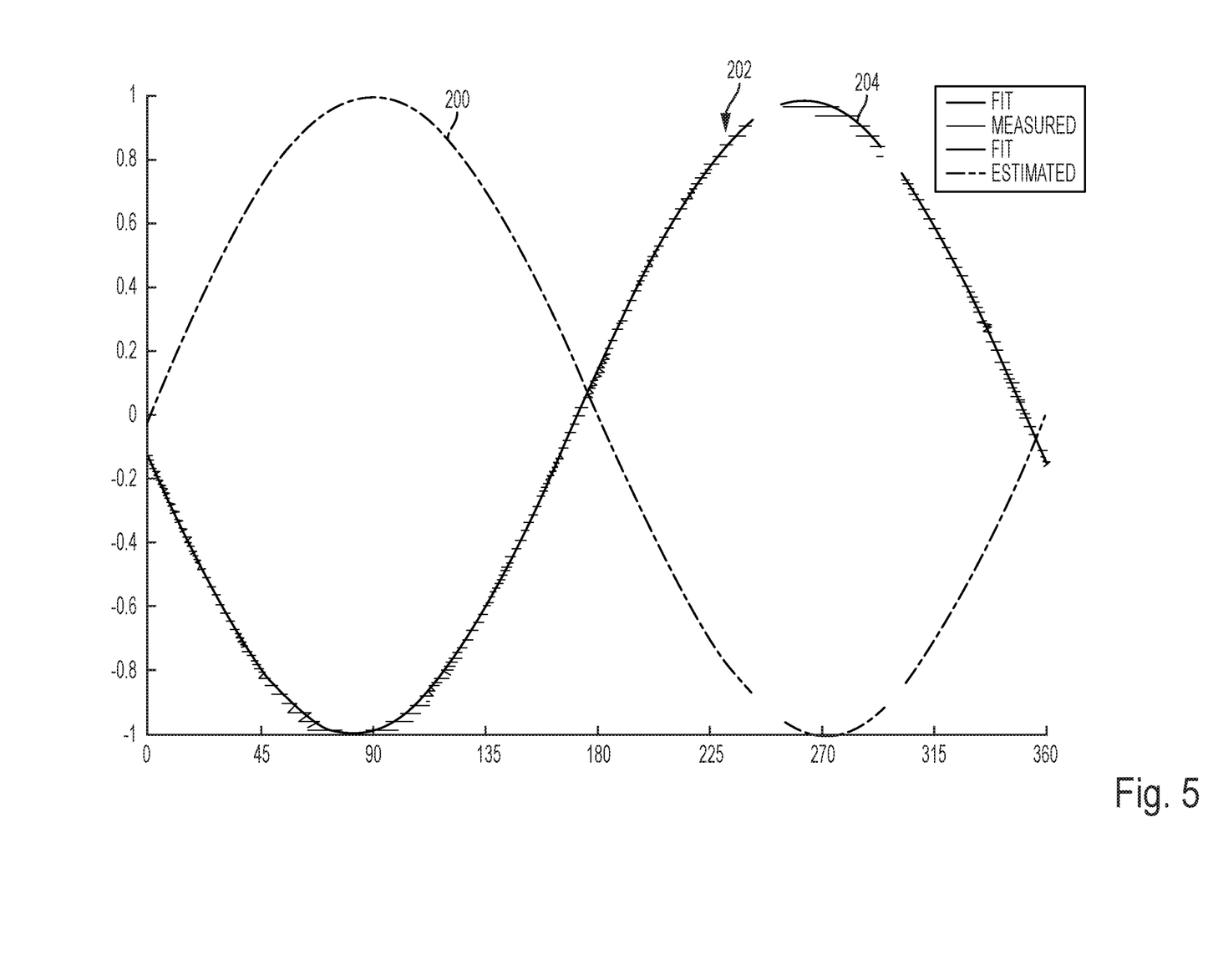
FIG. 5 is a chart illustrating an output generated using the turbine test function of FIG. 4 with a large phase difference.
Figure 6:
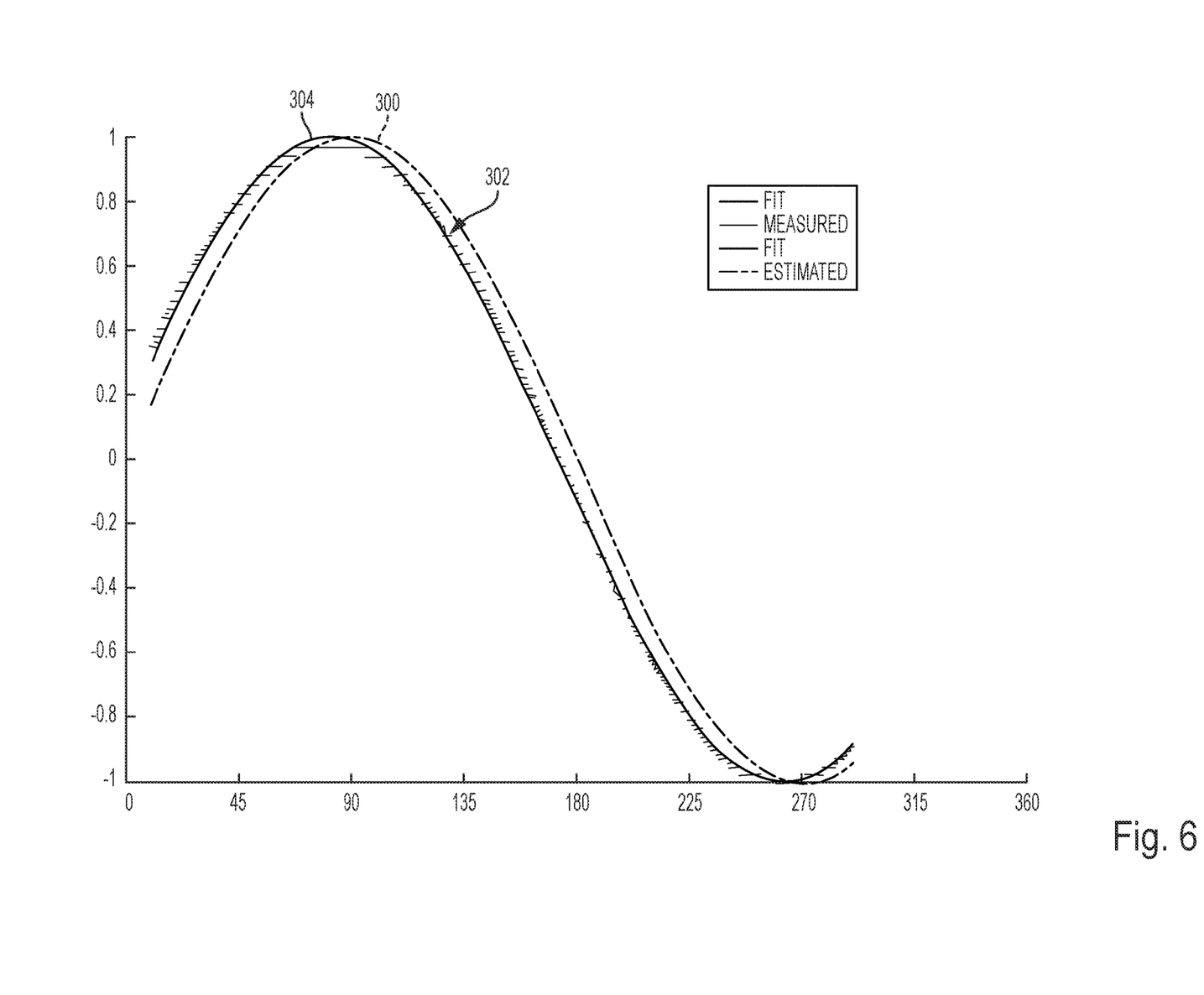
FIG. 6 is another chart illustrating an output generated using the turbine test function of FIG. 4 with a small phase difference.

To illustrate this, FIGS. 5 and 6 are provided as examples of where a comparison 108 will be applied and a phase difference determined 110. Each of FIGS. 5 and 6 represents a different case in which there is an error in the reading that is output from the rotor angle sensing system 24.

On each of FIGS. 5 and 6, an estimated blade load signal curve 200, 300 and a plurality of measured blade loads 202, 302 are plotted for one revolution of the rotor 16. Respective lines of best fit 204, 304 passing through the measured blade loads 202, 302 is also shown. The curves and measurements have been normalised so that the scale is easily readable.

Turning first to FIG. 5, it can be seen that a phase difference exists between the estimated blade load curve 200 and the line of best fit 204 for the measured blade loads 202. In this case, using the method of FIG. 4, a comparison 108 of the two curves 200, 204 is performed, and, at the next step, a phase difference between the curves 200, 204 of 172 degrees is determined 110.

Assuming a detection tolerance of approximately 8 degrees, a phase difference of 172 degrees corresponds to a high likelihood of one of two possible errors. The most likely scenario resulting in a phase difference of 172 degrees is that the zero-angle indicator 38 (see FIG. 2) is mounted in the wrong recess 36, and so the rotor angle is measured as 0 degrees when the reference blade 18a is positioned to point directly upwards. The second scenario is that the zero-angle indicator 38 is mounted in the correct recess 36 but the mounting portion 22 is mounted in the wrong orientation so that the reference marking, REF, is 172 degrees shifted from where it should be. To ascertain which scenario caused this error, inspection of the turbine 10 would be required.

Similarly, in FIG. 6, it can be seen that a phase difference exists between the estimated blade load curve 300 and the line of best fit 304 for the measured blade loads 302 and so, after performing a comparison 108 of the two curves, a phase difference between the curves of approximately 8 degrees is determined 110.

This phase difference is the result of the hub 20 being mounted wrongly to the mounting portion 22, such that the reference bolt 34 and the reference blade 18a do not align correctly. This results in the zero-angle indicator 38 passing the zero-angle sensor 40 slightly before or slightly after the reference blade 18a passes the zero-angle position, resulting in a small phase shift.

Following the calculation 110 of a phase difference, the phase difference is output 112 to an appropriate source, such as the user terminal 48 for viewing by an appropriate user, such as the user who initiated the test method 100. The phase difference may be output 112 as just a number indicating the relative phase difference, or may comprise a variety of information such as the estimated blade load signal 200, 300, the measured blade loads 202, 302 and the line of best fit 204, 304, and any other relevant information.

Using the output information, an error present in the rotor angle sensing system 24 is identified 114 based upon the calculated phase difference and any other information that is output from the system 24. In this embodiment, the identification 114 is performed by the user based on information output 112 to the user terminal 48.

In some embodiments, identifying 114 that an error is present may be automated. If an error is identified 114 as being present, the type of error that is present based upon the calculations done in relation to the phase difference may also be identified automatically. In some embodiments, the processing module 42 or system that is performing the automated process may require confirmation from a user to allow the method to continue to the next step. In some embodiments, the method may comprise a combination of automated steps and user input to achieve the best results.

To identify 114 an error automatically, a number of thresholds may be implemented based upon knowledge of the wind turbine 10 and the possible errors. For example, a single threshold may be implemented, above which an error is definitely present and below which there is merely slight deviation of the phases due to external effects. It is expected that this single threshold would be a minimum threshold for identifying a one bolt offset of the reference blade relative to the reference bolt 34. Multiple thresholds may be implemented to identify distinct error types.

It is envisaged that if the error identification step 114 is automated, then the output step 112 may not be required, and so, optionally, the method 100 progresses from the calculation 110 of the phase difference directly to identification 114 of an error.

Following identification 114 of an error, the operation of the wind turbine 10 is adjusted 116. To adjust 116 the wind turbine based upon any phase difference, a phase shift may be applied to all future measurements made using the rotor angle sensing system 24. This would be applicable to all cases, such as those of FIGS. 5 and 6.

In some situations where an error of approximately 180 degrees is identified 114, such as in the scenario of FIG. 5, the adjustment 116 may comprise moving the zero-angle indicator 38 from one recess 36 to the other recess 36, as the recesses 36 are positioned 180 degrees apart. A number of other errors may occur, such as the blade load sensor being wrongly positioned, the blades being wrongly aligned, or other measurement devices being wrongly positioned. Some errors may require an engineer to inspect the wind turbine 10.

To confirm that the change has been implemented correctly, the test method 100 may then be run again.

A number of alternatives embodiments exist and these will be discussed below. For example, blade load signals for three blades 18a, 18b, 18c may be estimated 106 in some embodiments, and each compared 108 against a blade load measured by a blade load sensor 44a, 44b, 44c of the corresponding blade 18a, 18b, 18c.

In some embodiments, the test method 100 is performed automatically following a software upgrade. This ensures that any correction or adjustment 116 made previously following performance of the test method 100 still applies.

In some embodiments, the idling mode at step 102 of the method 100 may comprise an alternative arrangement of the blades to that described above. For example, in one alternative arrangement, only the pitch angle of one of the wind turbine blades 18a, 18b, 18c is altered to adopt the feathered position, while the other two turbine blades are maintained in an operative position to enable continued rotation of the rotor 16.

As wind turbines 10 are often operated in non-ideal conditions, some embodiments may incorporate a blade load estimator that utilises additional measurements from wind turbine sensors to estimate the blade load signals. For example, one or more of blade pitch angle, rotor speed and wind speed may be selected to enable a more accurate determination of the blade load signal in non-ideal conditions, and it will be appreciated that a number of other parameters may also be measured and used to achieve a blade load signal that is adequate for comparison in these circumstances.

Many modifications may be made to the above examples without departing from the scope of the present invention as defined in the accompanying claims.

The invention claimed is:

1. A method of detecting an error in a rotor angle sensing system of a wind turbine, the wind turbine comprising:
   a rotor including a plurality of wind turbine blades; and
   a blade load sensor associated with a respective one of the plurality of wind turbine blades, wherein the blade load sensor is configured to output a measured blade load signal, wherein the rotor angle sensing system is configured to output a rotor angle signal;
   wherein the method comprises:
      generating an estimated blade load signal based on at least the rotor angle signal;
      comparing the estimated blade load signal with the measured blade load signal to determine a phase difference between them;
      identifying an error if the phase difference between the estimated blade load signal and the measured blade load signal exceeds a predetermined threshold; and
      operating the wind turbine in an idling mode comprising altering a pitch of one or more of the plurality of wind turbine blades to adopt a feathered position.

2. The method of claim 1, wherein operating the wind turbine in an idling mode is performed prior to generating the estimated blade load signal.

3. The method of claim 1, wherein the estimated blade load signal is indicative of a blade self-weight moment at an associated rotor angle.

4. The method of claim 1, wherein the estimated blade load signal is based on at least one of blade pitch angle, rotor speed and wind speed.

5. The method of claim 1, further comprising adjusting the operation of the wind turbine upon determining the error.

6. The method of claim 5, wherein adjusting the operation of the wind turbine comprises generating a control signal based on a modified rotor angle signal, wherein the modified rotor angle signal is determined by applying a phase shift to the rotor angle signal, the phase shift being equal to the determined phase difference.

7. The method of claim 5, wherein the rotor angle signal is measured relative to a designated reference blade, and wherein adjusting the operation of the wind turbine comprises re-designating the reference blade.

8. The method of claim 1, wherein comparing the estimated blade load signal with the measured blade load signal is performed for at least one revolution of the rotor.

9. The method of claim 1 further comprising identifying a type of the error if the phase difference between the estimated blade load signal and the measured blade load signal is in a predetermined range of values and adjusting the operation of the wind turbine based on the type of the error identified.

10. The method of claim 1, the wind turbine comprising a second blade load sensor corresponding to a second wind turbine blade of the plurality of wind turbine blades and configured to output a measured blade load signal for the second wind turbine blade.

11. A wind turbine comprising:
   a rotor including a plurality of wind turbine blades mounted to a hub, the rotor being rotatable about a central axis;
   a blade load sensor corresponding to one of the plurality of wind turbine blades, wherein the blade load sensor is configured to output a measured blade load signal;
   a rotor angle sensing system configured to output a rotor angle signal; and a non-transitory computer-readable medium containing computer program code that, when executed, performs an operation, comprising:
generating an estimated blade load signal based on at least the rotor angle signal;
comparing the estimated blade load signal with the measured blade load signal to determine a phase difference between them; and
identifying an error if the phase difference between the estimated blade load signal and the measured blade load signal exceeds a predetermined threshold; and
operating the wind turbine in an idling mode comprising altering a pitch of one or more of the plurality of wind turbine blades to adopt a feathered position.

12. The wind turbine of claim 11, wherein altering the pitch of one or more of the plurality of wind turbine blades occurs prior to generating the estimated blade load signal.

13. The wind turbine of claim 11, wherein the estimated blade load signal is indicative of a blade self-weight moment at an associated rotor angle.

14. The wind turbine of claim 11, wherein the estimated blade load signal is based on at least one of blade pitch angle, rotor speed and wind speed.

15. The wind turbine of claim 11, the operation further comprising adjusting the operation of the wind turbine upon identifying the error, wherein adjusting the operation of the wind turbine comprises generating a control signal based on a modified rotor angle signal, wherein the modified rotor angle signal is determined by applying a phase shift to the rotor angle signal, the phase shift being equal to the determined phase difference.

16. A non-transitory computer-readable medium containing computer program code that, when executed, performs an operation for error detection in a wind turbine comprising a rotor including a plurality of wind turbine blades mounted to a hub, the rotor being rotatable about a central axis; wherein the operation comprises:
generating an estimated blade load signal based on at least a rotor angle signal output by a rotor angle sensing system;
comparing the estimated blade load signal with a measured blade load signal to determine a phase difference between them, wherein the measured blade load signal is output by at least one blade load sensor corresponding to one of the plurality of wind turbine blades; and
identifying an error if the phase difference between the estimated blade load signal and the measured blade load signal exceeds a predetermined threshold; and
operating the wind turbine in an idling mode comprising altering a pitch of one or more of the plurality of wind turbine blades to adopt a feathered position.

17. The non-transitory computer-readable medium of claim 16, wherein altering the pitch of one or more of the plurality of wind turbine blades occurs prior to generating the estimated blade load signal.

18. The non-transitory computer-readable medium of claim 16, the operation further comprising adjusting the operation of the wind turbine upon identifying the error, wherein adjusting the operation of the wind turbine comprises generating a control signal based on a modified rotor angle signal, wherein the modified rotor angle signal is determined by applying a phase shift to the rotor angle signal, the phase shift being equal to the determined phase difference.

* * * * *